United States Patent [19]

Johnson et al.

[11] 4,119,967

[45] Oct. 10, 1978

[54] MICROWAVE DUAL MODE NON-INTERFERING CW AND PULSED SIGNAL SYSTEM METHOD AND APPARATUS

[75] Inventors: Gilbert R. Johnson, Cupertino; Frank A. Olson, Palo Alto, both of Calif.

[73] Assignee: Teledyne, Inc., Los Angeles, Calif.

[21] Appl. No.: 690,104

[22] Filed: May 21, 1976

[51] Int. Cl.² .............................................. H04B 7/00

[52] U.S. Cl. .............................. 343/100 PE; 343/756; 333/21 A

[58] Field of Search ......................... 343/100 PE, 756; 333/21 A

[56] References Cited

U.S. PATENT DOCUMENTS

| | | | |
|---|---|---|---|
| 2,619,635 | 11/1952 | Chait | 343/100 PE |
| 2,885,542 | 5/1959 | Sichak | 343/100 PE |
| 2,942,261 | 6/1960 | Jones et al. | 343/756 |
| 3,034,118 | 5/1962 | Parisi | 343/100 PE |
| 3,092,828 | 6/1963 | Allen | 343/100 PE |
| 3,540,045 | 11/1970 | Taylor | 333/21 A |
| 3,668,567 | 6/1972 | Rosen | 343/756 |
| 3,688,313 | 8/1972 | Kern | 343/7.3 |

*Primary Examiner*—Maynard R. Wilbur
*Assistant Examiner*—T. M. Blum
*Attorney, Agent, or Firm*—Limbach, Limbach & Sutton

[57] ABSTRACT

A microwave system is disclosed for simultaneous amplification and radiation of CW and pulsed signals wherein signals from a CW amplifier tube and a pulsed power amplifier tube are transmitted to an antenna where they are radiated as signals with circular polarizations of opposite direction. In one embodiment interstage circuitry between the amplifiers and the antenna includes a magic "T" hybrid and a 90° phase shifter.

2 Claims, 11 Drawing Figures

MICROWAVE DUAL MODE NON-INTERFERING CW AND PULSED SIGNAL SYSTEM METHOD AND APPARATUS

BACKGROUND OF INVENTION

The present invention is directed to a microwave dual mode non-interfering CW and pulsed signal system principally desirable for electronic countermeasures equipment.

Modern ECM equipment can be grouped into the categories of CW, pulsed, and dual mode signal systems. CW systems have the capability of providing continuous wave transmission and generally employ some type of noise modulation to degrade enemy radars. Pulsed systems respond to the threat radar on a pulse by pulse basis and function through deceptive techniques. The designation of a "dual mode" system implies the ability for the system to provide CW or pulsed, or a combination CW and pulsed transmission.

Because certain threats are best handled with CW capability and other threats are best countered with pulsed capability, it is desired for versatility to incorporate dual mode capability. This desire has been recognized for many years, and although some existing equipments incorporate dual mode capability, several limitations exist. An optimum dual mode system would have the inherent CW capability of a CW-only system and the pulsed capability of a pulsed-only system. In present dual mode systems, one mode or the other has been severely compromised. For example, for one typical application CW systems have the capability of providing 200+ watts of power and pulsed systems 1 to 2 kW of peak power, whereas the dual mode system has the capability of about 200 watts CW and 500 watts pulsed. While it would be desired in a dual mode system to have CW power comparable to what is available in a CW-only system and a pulsed power capability 10 dB higher, existing dual mode systems have pulsed power only about 3 dB higher than the CW capability.

The majority of the effort to design and develop the ideal dual mode system has been directed toward development of a traveling-wave tube amplifier which has the ability to operate CW, pulsed or both. Due to the nature of the interaction process in the traveling-wave amplifier, it has not been possible to design tubes which operate at widely different power levels efficiently and with stability.

In the systems proposed to date using separate CW and pulsed traveling-wave tube amplifiers, either separate antennas must be used for the separate signals or half the power of each tube is lost in combining the power outputs for dual mode operation with one antenna or two antennas can be used, but with each radiating only one-half of the power capability of the separate CW and pulsed tubes.

SUMMARY OF THE INVENTION

In accordance with the method and apparatus of the present invention, a dual mode system is provided having a CW amplifier tube, a pulsed power amplifier tube, a single antenna and circuitry for causing the signals from the CW and pulsed tubes to be radiated from the antenna as signals with circular polarizations of opposite sense.

In one embodiment of the present invention the signals from the CW and pulsed amplifiers are connected to a magic "T" hybrid and the outputs of the hybrid are introduced into separate input ports to a dual-polarized quad ridge antenna with a phase shifter positioned in one arm between the hybrid and the antenna for adjusting the phase with respect to the other arm to result in effective opposite circular polarization of the two signals.

Thus, a dual mode system is provided using only a single antenna and capable of transmission and radiation separately or together of separate signals from both a CW amplifier tube and a pulsed amplifier tube for full power operation of each of the separate tubes on a non-interfering basis.

These and other features and advantages will become more apparent upon a perusal of the following specification taken in conjunction with the accompanying drawings wherein similar characters of reference refer to similar structures in each of the several views.

DESCRIPTION OF THE PREFERRED EMBODIMENT

Figure 1:
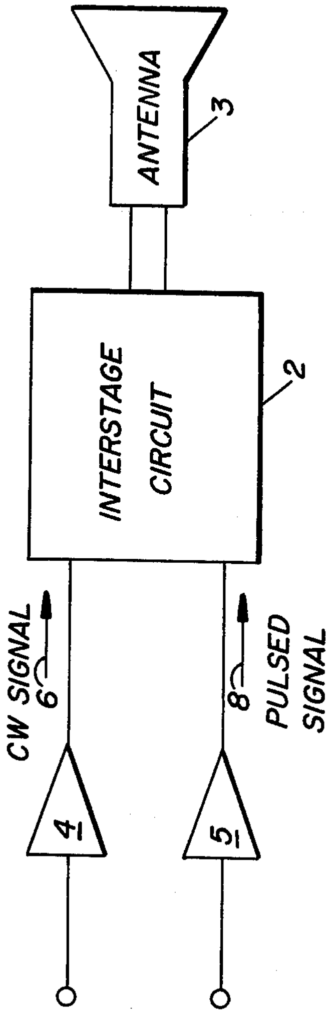
FIG. 1 is a schematic block diagram view illustrating the present invention.

Referring now to the drawings, particularly with reference to FIG. 1, there is shown a schematic block diagram illustrating the present invention. As illustrated, the method and apparatus of this invention includes the use of a CW amplifier 4 and a pulsed amplifier 5, the output signals 6 and 8, respectively, from which are processed in interstage circuitry 2 before transmittal to the antenna 3 at which the two signals are radiated with circular polarizations of opposite sense.

Figure 2:
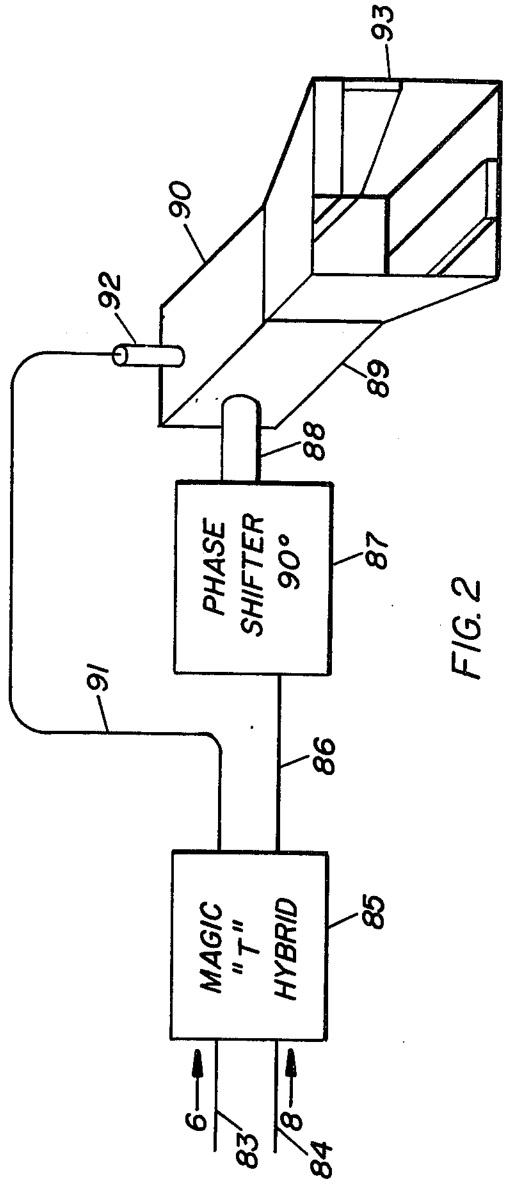
FIG. 2 shows one embodiment of the present invention.

In accordance with the illustrative embodiment of the present invention illustrated in FIG. 2, the CW and pulsed signals 6 and 8, respectively, are directed into arms 83 and 84 of a magic "T" hybrid 85. Half of each of these signals is transmitted from one output arm 86 of the hybrid through a phase shifter 87 to one of two orthogonal input ports 88 on the quad ridge guide portion 89 of a dual-polarized quad-ridge antenna 90. The other half of each signal is taken out of output arm 91 of the hybrid 85 and conducted to the other input 92 of the quad ridge guide 89 of the dual-polarized quad-ridge antenna 90. From the horn portion 93 of the antenna 90, the CW and pulsed signals are radiated as circularly polarized signals of opposite sense.

Thus, the CW signal 6 going into the magic "T" 85 is split into two signals, the signal in the arm 91 being at 0° phase and the signal in arm 86 being at 180° phase. After passing through the phase shifter 87 the signal into input port 88 will be 270° phase while the half of the signal in input 92 will be at 0° phase. Similarly, the pulsed power signal 8 will be divided between arms 91 and 86 by the magic "T" 85, with the phase of the signal in arm 91 considered at 0° and the phase of the signal in arm 86 considered at 0°. Upon passing through the 90° phase shifter, the half of the pulsed power signal at input port 88 will be at 90° phase while the half of the pulsed signal at input port 92 will be at 0° phase. Accordingly, the CW and pulsed signals radiating from the horn 93 will appear as circularly polarized signals of opposite sense.

Other structures can be utilized for accomplishing the oppositely directed circularly polarized signals at the antenna horn. One such structure is illustrated in FIGS. 3–11.

The detailed structure of FIGS. 3–11 forms a part of applications "Microwave Dual Mode Transmission Method and Apparatus for Propagating Non-Interfering Signals" by N. Pond and D. Zavadil and "Microwave Antenna With Two Inputs And Radiating Oppositely Polarized Signals" by R. W. Redelings, filed concurrently herewith and assigned to the assignee of the present invention. As shown in FIGS. 3–11, the CW signal 6 from a CW microwave traveling-wave amplifier 4 is introduced into the input end 7 of a double ridge waveguide transmission line 10, and then through a transition transmission section 20 into a quad ridge waveguide line 30. A pulsed signal 8 from a pulsed microwave traveling-wave amplifier 5 is coupled into the quad ridge waveguide via an input coupling 9 such that the electric field vectors of the two signals are propagated orthogonally in the quad ridge waveguide without mutual interference in their primary modes of propagation. The two signals 6 and 8 are propagated from quad ridge guide 30 to a second transition transmission section 50 and thence through an octagonal waveguide 60 for radiation out of a horn 70, connected on the output end thereof.

The double ridge guide 10 includes a pair of ridges 11 and 12 projecting inwardly from a first pair of opposed sidewalls 13 and 14, respectively, a second pair of opposed sidewalls 15 and 16.

The quad ridge waveguide includes a first pair of opposed quad ridges 31 and 32 projecting inwardly from a pair of opposed sidewalls 33 and 34, respectively, in between opposed sidewalls 35 and 36. A second pair of opposed quad ridges 37 and 38 project inwardly of the quad guide 30 from sidewalls 35 and 36, respectively.

The transition section 20 is a waveguide having a pair of opposed transition ridges 21 and 22 projecting inwardly from opposed sidewalls 23 and 24, repectively, between opposed sidewalls 25 and 26, and transition ridges 21 and 22 connect the ridges 11 and 12 of the double ridge waveguide 10 to the ridges 31 and 32 of the quad ridge waveguide 30. The transition section also includes a pair of opposed, tapered transition ridges 27 and 28 which taper from the flat sidewalls 15 and 16 of the double ridge waveguide 10 to full height where they are connected to the quad ridges 37 and 38 in the quad ridge waveguide.

Figures 3, 4, 5, 6, 7, 8, 9, 10, 11:
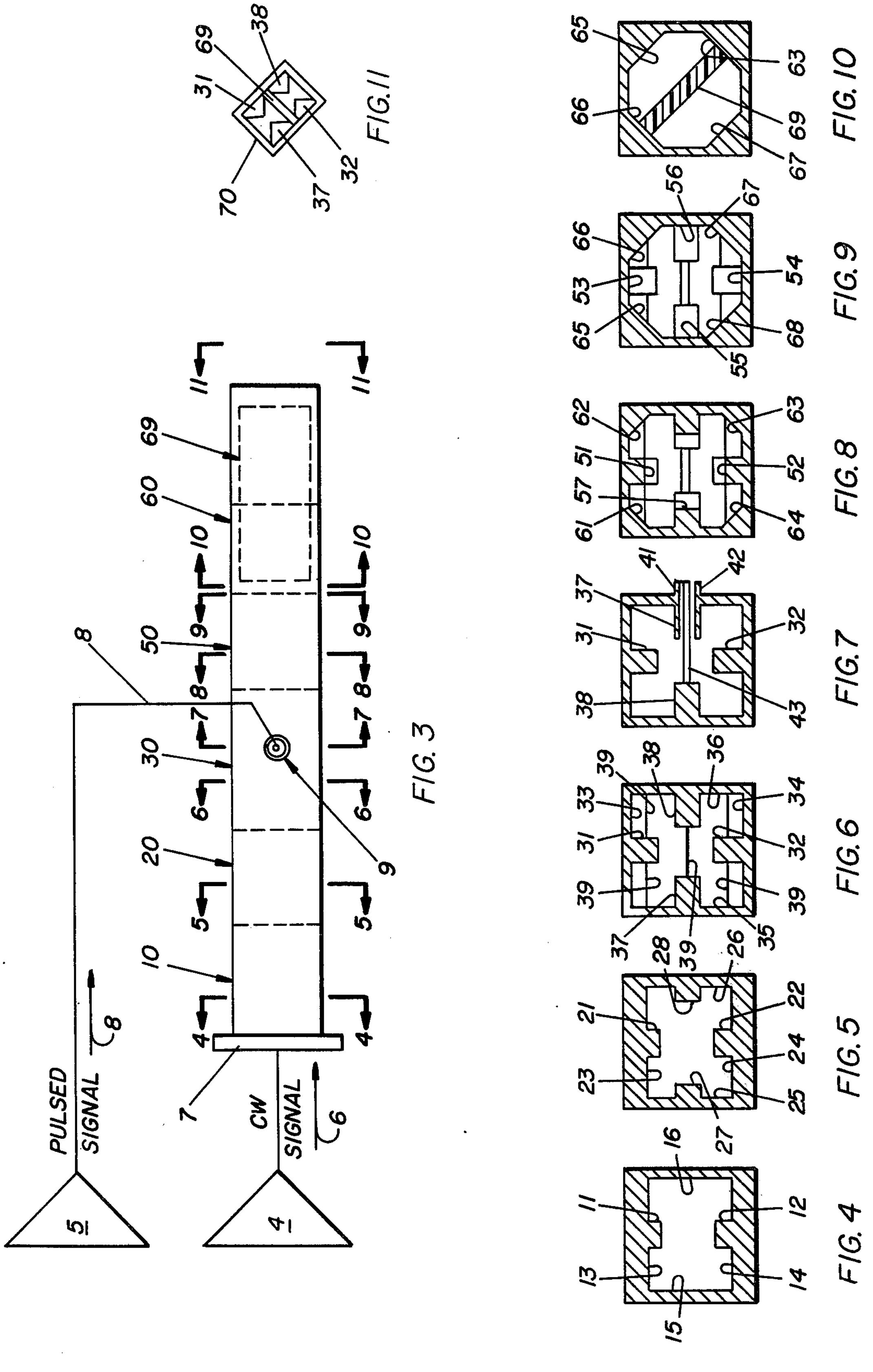
FIG. 3 shows an alternative embodiment of the present invention.
FIGS. 4, 5, 6, 7, 8, 9 and 10 are enlarged schematic elevational sectional views of the structure shown in FIG. 3, taken along the lines 4—4, 5—5, 6—6, 7—7, 8—8, 9—9 and 10—10, respectively, in the direction of the arrows.
FIG. 11 is an end view of the structure shown in FIG. 3, taken along line 9—9 in the direction of the arrows.

An electrical short circuit is provided in the quad ridge waveguide 30 by a plurality of parallel conductors 39, arranged in the direction of the second pair of opposed quad ridges 37 and 38. As illustrated in FIG. 6, conductors are connected between the closest portions of opposed ridges 37 and 38 and other conductors can connect the sidewalls of ridges 31 and 32 to the sidewalls 35 and 36 of the quad ridge waveguide.

An input coupling is provided to couple the second signal 9 into the quad ridge waveguide for propagation orthogonal to the propagation of the first signal 7. In the embodiment illustrated this coupling is accomplished by a coaxial line 41 which has its outer conductor 42 connected to the wall of ridge 38 closest to the opposed ridge 37 and its center conductor wire 43 passing through the outer conductor 42, through ridge 38 and terminated on the face of ridge 37 closest to the face of ridge 38.

In the second transition transmission line 50 the ridges 31, 32, 37 and 38 of the quad ridge guide taper as tapered ridge portions 51, 52, 57, and 58 back to the walls 53, 54, 55, and 56 in the same positions as walls 33, 34, 35, and 36 of the quad ridge guide. At all four diagonally opposite corners of the quad ridge guide the sidewalls taper as tapered corners 61, 62, 63, and 64, to become the diagonally oriented sidewalls 65, 66, 67, and 68 of the octagonal guide 60.

A dielectric slab member 69, such as of Teflon, is mounted transversely in the octagonal guide 60 between walls 66 and 68 for cooperation with the tapered horn 70 to produce polarization of the microwave signals in opposite sense. The horn has an asymmetrical output aperture as shown in FIG. 9 and a dielectric lens material such as Rexolite 1422 (not shown) is positioned in the aperture for impedance matching and also on the outside walls of the aperture for beam shaping.

The dielectric slab and the tapered horn effectively divide each of the signals into two components and produce a 90° phase shift between the two components of each of the two signals to produce the circularly polarized signals having circular polarizations of opposite sense.

The short circuit conductors 39 prevent the propagation of the pulsed signal back to the CW amplifier 4 and the orientation of the center conductor 43 of the pulsed signal coaxial input line 41 prevents any appreciable coupling of the CW signal back to the pulsed amplifier 5. Whereas other types of signals could be applied to the two inputs of the microwave transmission line and the coaxial and double ridge inputs for the pulsed and CW signals, respectively, reversed, the illustrated embodiment is ideally suited for handling the high average powers of a CW signal through the double ridge guide and the pulsed signal through the coaxial input. Additionally, other structures for coupling the pulsed signal into the qual ridge guide, besides a coaxial line, can be utilized; however, for this embodiment of orthogonal propagation of the two waves in the quad ridge guide and the short circuit for preventing the pulse signal from traveling back to the CW source, the coaxial line is ideally suited.

The parameters for a system in accordance with the present invention and utilizing the circuitry and antenna structure of FIG. 2 would include power handling capability of 2kW peak and 300 watts average power and 15dB minimum isolation between ports of the antenna. For a system operating at a frequency of 2.6–5.2 GHz and VSWR of 2.0–1 the antenna axial ratio boresite would be 4.0dB with a beamwidth (3dB) of 80°–55° for azimuth and 44°–21° for elevation. The linear gain (ref. linear isotropic) would be 3dB–8db and antenna dimensions of 6.42 by 3 by 10 inches in length and weighing about 2.8 lbs. For a system operating at a frequency of 8.0–16.0GHz and VSWR of 2.0–1 the antenna axial ratio boresite would be 3.9dB with a bandwidth (3dB) of 90°–70° for azimuth and 55°–30° for elevation. The linear gain (ref. linear isotropic) would be 2.0–8.0dB and antenna dimensions of 2 × 2 by 5.34 inches in length and weighing about 0.5 lbs.

In a system of the type described incorporating the double ridge, quad ridge, and antenna structure described above employing a CW traveling wave tube, a pulsed traveling wave tube, equalizers, modulator and high voltage power supply, a package weighing about 40 pounds and occupying about 700 cubic inches could produce primary frequency coverage at 8.0–16.0 GHz and primary power output of 200 watts CW and 2kW peak or secondary frequency coverage of 7.5–18GHz and secondary power output of 100 watts CW and 1kW peak with gain of 40dB using 1.8kW prime input power and pulse response time of 30 nanoseconds video to RF.

What is claimed is:

1. A microwave subsystem capable of simultaneously amplifying CW and pulsed signals comprising, in combination, a CW amplifier tube, a pulsed power amplifier tube, a magic "T" hybrid having two input arms and two output arms, means for coupling a first signal from said CW amplifier tube to one of said input arms of said hybrid, means for coupling a second signal from said pulsed power amplifier tube to the other of said input arms of said hybrid, means for shifting by 90° the phase of the signals in one of said output arms of said hybrid, a double ridge waveguide having first and second pairs of opposed sidewalls and a pair of ridges projecting inwardly from said first pair of double ridge sidewalls, means for coupling said first CW signal from said magic "T" to said double ridge waveguide, a quad ridge waveguide including first and second pairs of opposed sidewalls having respectively first and second pairs of ridges projecting inwardly therefrom, a transition guide connecting said double ridge and said quad ridge waveguides and having a first pair of ridges connected to said pair of ridges of said double ridge waveguide and said first pair of ridges of said quad ridge waveguide and having a pair of opposed tapered transition ridges tapering from said second pair of double ridge sidewalls to said second pair of ridges of said quad ride waveguide, means for coupling said pulsed power signal from said magic "T" to said quad ridge waveguide for propagating said pulsed power signal therein orthogonally with respect to said CW signal, means for providing a short circuit in said quad ridge waveguide between said means for coupling side pulsed power signal thereto and said transition guide for preventing propagation of said pulsed power signal into said double ridge waveguide whereby said CW signal and said pulsed power signal propagate orthogonally in said double ridge waveguide, an antenna for radiating said CW and pulsed signals, and means connecting said antenna to said quad ridge waveguide including means for polarizing said orthogonally propagating CW and pulsed signals in opposite sense whereby said CW and pulsed signals are radiated from said antenna as signals with circular polarizations of opposite sense.

2. A method of simultaneously generating and radiating CW and pulsed microwave signals comprising the steps of:

generating a CW signal, generating a pulsed signal, shifting the phase of said signals by 90°, introducing said phase adjusted CW and pulsed signals into a single waveguide with said signals propagating othogonally with respect to each other.

circularly polarizing said orthogonally propagating CW and pulsed signals in opposite sense and radiating said CW signal as a circularly polarized signal in one direction from an antenna and radiating said pulsed signal from said antenna as a circularly polarized signal of a direction opposite said one direction.

* * * * *